March 20, 1951 W. M. RUST 2,546,015

OUTPUT COUPLING CIRCUIT FOR BALANCED HIGH-FREQUENCY GENERATORS

Filed May 19, 1945 2 Sheets-Sheet 1

WITNESSES:

Leon M. Garman

INVENTOR

William M. Rust.

BY

F. W. Lyle.

ATTORNEY

March 20, 1951 W. M. RUST 2,546,015

OUTPUT COUPLING CIRCUIT FOR BALANCED HIGH-FREQUENCY GENERATORS

Filed May 19, 1945 2 Sheets-Sheet 2

WITNESSES:

E. G. McCloskey.

Wm. C. Groome

INVENTOR

William M. Rust.

BY F. W. Lyle.

ATTORNEY

Patented Mar. 20, 1951

2,546,015

UNITED STATES PATENT OFFICE 2,546,015

OUTPUT COUPLING CIRCUIT FOR BALANCED HIGH-FREQUENCY GENERATORS

William M. Rust, Cortland, N. Y., assignor to Westinghouse Electric Corporation, East Pittsburgh, Pa., a corporation of Pennsylvania Application May 19, 1945, Serial No. 594,631

16 Claims. (Cl. 178—44)

My invention relates to high-frequency circuits and, in particular, relates to a coaxial-type resonant circuit which may serve, for example, as the output circuit of a balanced high-frequency oscillator.

One of the most convenient types of high-frequency oscillator is one employing a pair of tubes, operating in push-pull relation of a balanced type. The resonant circuit for such oscillators is usually provided in the form of a two-conductor transmission line, the two conductors being short-circuited to each other at a distance of approximately a quarter-wave length from their points of connection to the generator. Output is usually led to the load supplied from a circuit of this kind through a two-wire line tapped onto the quarter-wave section at such a point of its length as produces the desired output from the oscillator. A problem arises, however, when the two-conductor line is a coaxial transmission line with the sheath grounded, or is otherwise unbalanced since the unbalanced line tends to disturb the balance of the oscillator circuit.

My invention provides a solution of this problem by connecting the coaxial output line to a resonant circuit, itself having the form of a coaxial line approximately one-quarter wave length long, and having a slot cut in each side of the outer conductor parallel to the axis. The two halves of the outer conductor thus form a two-conductor tuned cathode circuit for the oscillator. A short direct connection between the inner conductor and one side of the outer conductor completes the coupling system. The coupling between the tube resonant circuit and the transmission line may be varied either by changing the position of this connection, or by using external circuits forming parts of the output line which reflect the proper matching impedance to this resonant cathode circuit. The low characteristic impedance of this resonant cathode circuit results in maintenance of a good balance of load between the push-pull tubes of the oscillator.

One object of my invention is, accordingly, to provide a resonant circuit coupled to an unbalanced coaxial output line which shall produce very little or no unbalance on a balanced input circuit likewise coupled to said resonant element.

Another object of my invention is to provide a resonant circuit operating in association with a pair of push-pull tubes, to form an oscillation generator, and which is adapted to couple a grounded transmission line to said tubes without introducing substantial unbalance in said oscillator.

A still further object of my invention is to provide a coaxial-type resonator in combination with a pair of electron tubes forming a push-pull oscillator, particularly adapted to ultra-short-wave work and which is adapted to be connected to a coaxial load line.

Other objects of my invention will become apparent upon reading the following description, taken in connection with the drawings, in which.

Figure 1:
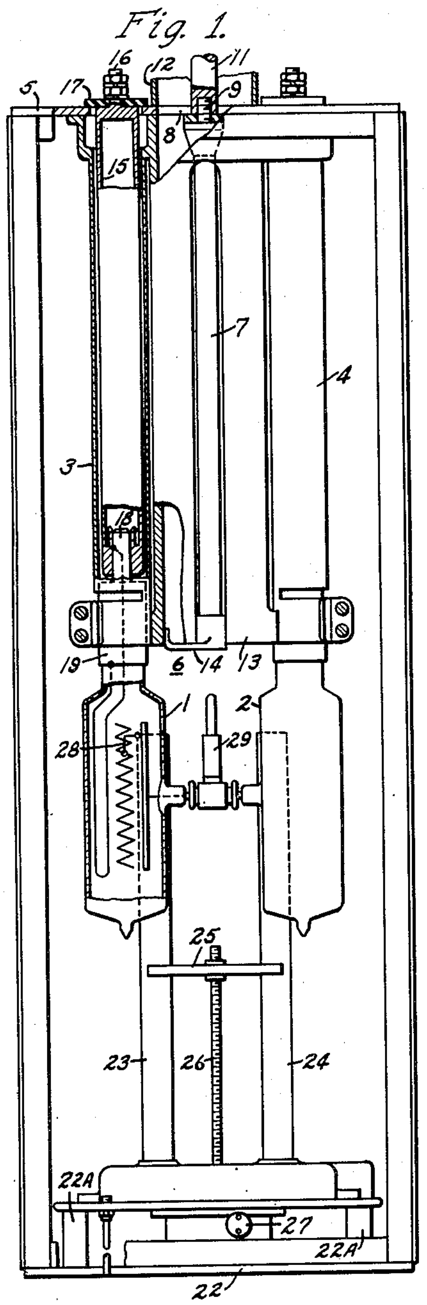
Figure 1 is a view, partly in elevation and partly in section, of an oscillation generator embodying the principles of my invention.
Figure 2:
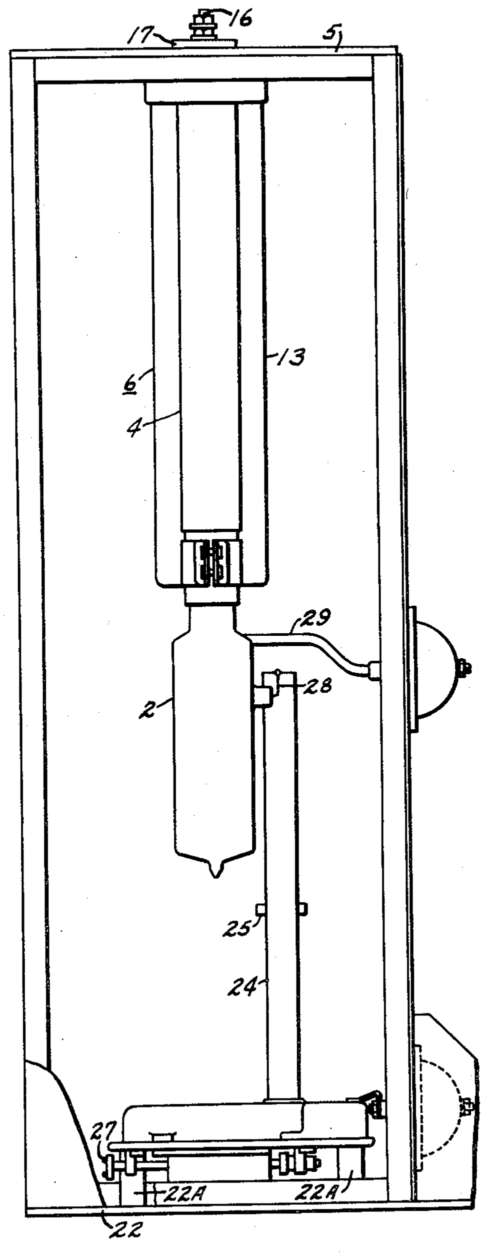
Fig. 2 is an elevational view, partly in section, and taken at right-angles to Fig. 1.
Figures 3, 4, 5:
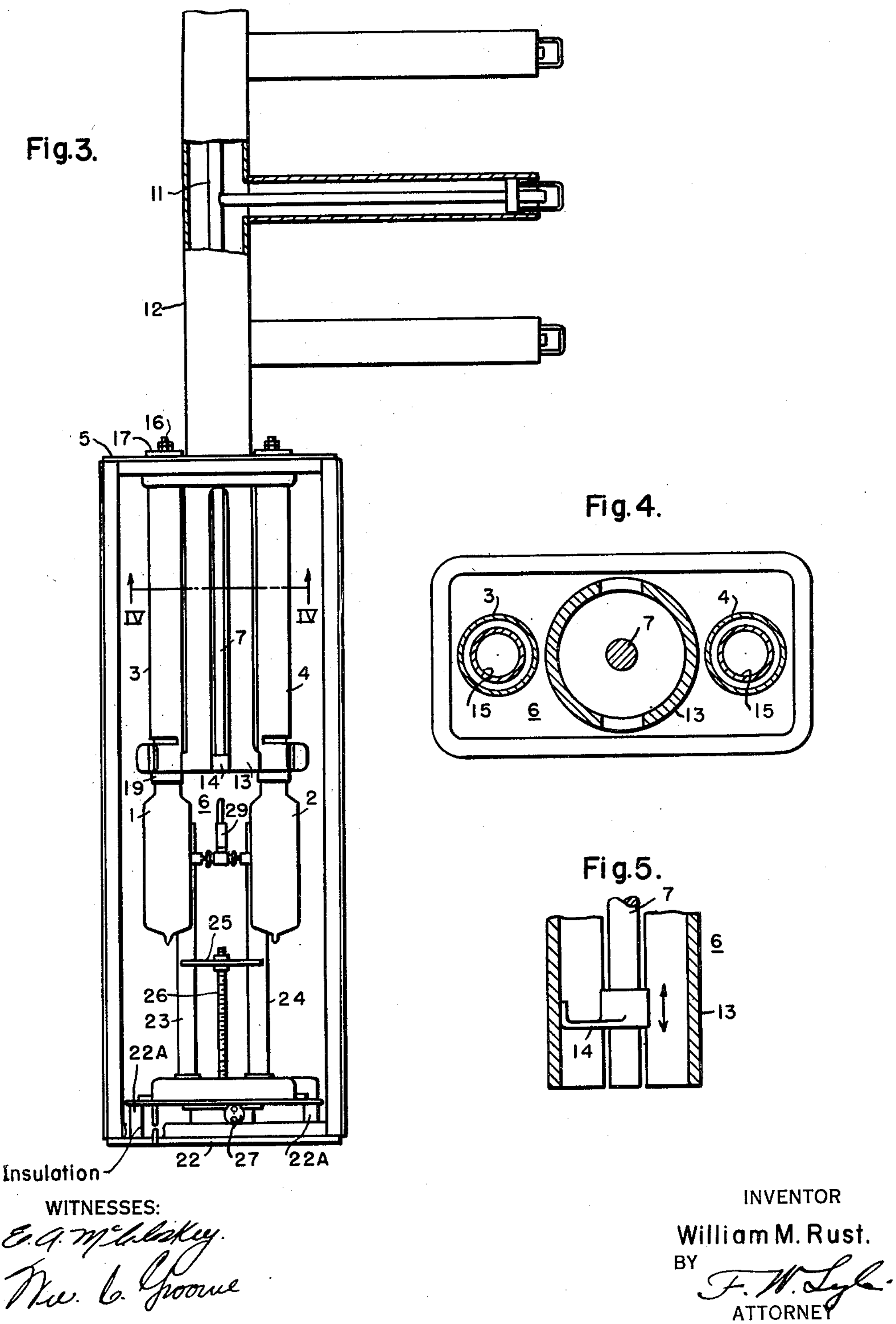
Fig. 3 is an elevational view, partly in section, to smaller scale of the arrangement of Fig. 1.
Fig. 4 is a sectional view along the plane IV—IV of Fig. 1.
Fig. 5 is a view partly in section of an adjustable connector appearing in small scale on Fig. 1.

Referring in detail to Figures 1, 2 and 3, a pair of similar triodes 1, 2 are supported in suitable sockets 3, 4 for operation as a push-pull oscillation generator. The member 3, which is of identical structure with the member 4, comprises an outer tubular member connected at its upper end to a support plate 5 which also serves to support a quarter-wave concentric-line-type resonator 6 forming one of the characteristic features of my invention. The resonator 6 comprises an inner cylinder or core 7 which is separated at its upper end from the plate 5 by an opening 8. A threaded extension 9 on the core 7 extends through the opening 8, and is adapted for connection to the core 11 of a concentric output line leading to the load supplied by the oscillator. The core 11 cooperates with a concentric sheath 12 which abuts and makes contact with the support plate 5. The remaining part of the resonator 6 is a tubular portion 13, making contact at its upper end with the support plate 5 and positioned concentrically with the core 7. Two diametrically opposite slots, made as narrow as possible, but wide enough to prevent RF voltage flash-over, are cut in portion 13 parallel to the axis of the core 7 each slot having a length approximately equal to one-quarter of the wave length to be generated by the oscillator tubes 1 and 2. The length of the portion 13 is only slightly greater than the above-mentioned quarter-wave length, and an adjustable bridge member 14 is provided to connect the core 7 to portion 13 at one side of the slots therein.

The socket 3 comprises an outer tubular member already described and an inner tubular member 15 closed at its upper end and terminating in a contact stud 16. The member 15 is supported and insulated from the support plate 5 by a suitable insulating plate 17 through which the stud 16 projects. The lower end of the tube 15 is closed except for a central hole adapted to slidably engage a central contact pin 18 projecting from the base 19 of the tube 1. Flexible contact fingers may project upwardly from the sides of the tube 15 to insure firm contact with the pin 18 in a manner well known in the radio-tube art.

Fig. 4 shows the structure of the socket 3, slotted tubular portion 13 and core 7 in more detail.

The base 19 of the tube 1 comprises a conducting sleeve which makes sliding engagement with the outer cylinder of the socket 3. The cathode heating terminals of the tube 1 are respectively connected to the sleeve 19 and the pin 18. The inner tube 15 and outer tubular wall of the socket 3 are respectively connected to the contact stud 16 and to the support plate 5. By connecting any suitable source of voltage between the contact stud 16 and the base plate 5, the cathode of the tube 1 may be heated to a suitable operating temperature.

The tube 2 is provided with exactly similar support and contact elements within the socket 4 to those already described in the case of tube 1 and socket 3.

The sockets 3 and 4 are made of substantially the same length as the resonator 6 and are accordingly substantially one-quarter wave length of the output of the push-pull oscillator comprising tubes 1 and 2.

The support plate 5 is connected by suitable conducting framework with a base plate 22 which supports on insulators 22A a base-plate for two conducting cylinders 23, 24 substantially parallel to the axis of the resonator 6. The insulators 22A are by-passed by a resistor or other suitable grid-return for tubes 1 and 2. Between the cylinders 23 and 24 is bridged a sliding contact member 25 which may be operated by a suitable threaded support 26 operated by a handwheel 27 through appropriate linkage, whereby the distance of the contact member 25 below the upper ends of the cylinders 23 and 24 may be regulated.

The control electrode of the tube 1 is connected by a suitable connecting member 28 with the upper end of the cylinder 23 and a similar connector joins the grid of the tube 2 to the upper end of the cylinder 24.

The plates of the tubes 1 and 2 are connected together through a suitable conductor 29 to the positive terminal of the source of direct-current voltage used for supplying energy to the oscillator. The negative terminal of this voltage source is connected to the support plate 5.

Movement of the connector 25 by the screw 26 may be used to tune the grid circuit of the push-pull oscillator.

The arrangement above described has the following advantages:

1. It provides a closer match between the Lecher system, comprising the resonator 6 on the one hand, and the circuit of the coaxial cable 11, 12, on the other.

2. The resonator 6 has a very high "Q," very small radiation leakage and very high energy storage.

3. The inner conductors 7 and 11 are well shielded from external effects.

4. The arrangement may be tuned by the use, familiar to those skilled in the high-frequency art, of tuning stubs 31, 32 and 33 on the output line 11, 12. Since such tuners are well known in the ultra-high-frequency-wave art, detailed description of those members is believed to be unnecessary.

5. The resonator 6 constituting a component of the Lecher system forms a continuation of the outer sheath of the coaxial cable.

6. The arrangement is very simple mechanically to construct.

While I have shown the connector 14 between the central cylinder 7 and the outer cylinder 13 of the resonator 6 as positioned at the end of the cylinder 6, it may be positioned at some intermediate position between the ends of the cylinder 13, as shown in more detail in Fig. 5.

I claim as my invention:

1. In combination with a balanced source of alternating voltage having two ungrounded phase terminals, a circuit element comprising a central cylindrical core, a tubular outer sheath insulated therefrom, two slots in said sheath each having a length substantially equal to one-quarter of the wave length of said source, a direct-current cross-connection having one end on said sheath between a pair of said slots and its other end on said core, connections from said phase terminals respectively to the ends of said outer sheath between said slots, and a coaxial cable having its sheath grounded and connected to said outer sheath adjacent the roots of said slots and having its core connected to said cylindrical core.

2. In combination with a balanced source of alternating voltage having two ungrounded phase terminals, a circuit element comprising a central cylindrical core, a tubular outer sheath insulated therefrom, two slots in said sheath each having a length substantially equal to one-quarter of the wave length of said source, means for connecting one side of an unbalanced circuit to said core and the other side to said sheath adjacent the root of said slots, a direct-current cross-connection having one end on said sheath between a pair of said slots and its other end on said core, and connections from said phase terminals respectively to the ends of said outer sheath between said slots.

3. In combination with a balanced source of alternating voltage having two ungrounded phase terminals, a circuit element comprising a central cylindrical core, a tubular outer sheath insulated therefrom and provided with a pair of slots having a length substantially equal to one-quarter of the wave length of said source, cross-connections to said core from a point on said sheath between said slots, and means connecting the sheath of a concentric line having a grounded sheath to said sheath adjacent the root of said slots and the core of said concentric line to said core, and connections from said phase terminals respectively to the ends of said outer sheath between said slots.

4. In combination with a circuit element comprising a central core and a surrounding sheath concentric therewith, a support base for said sheath, two cylindrical sockets for grid-controlled electron tubes supported with their axes substantially parallel to the axis of said core and having the ends remote from said support base connected directly to the ends of said sheath remote from said base and also adapted to receive the base of said electron tubes, said sockets and said core being of substantially the same length, said sheath having a pair of lots extending from one end thereof parallel to the axis of said sheath and a direct conductive cross-connection from said core to a point on said sheath between said slots.

5. In combination with a circuit element comprising a central core and a surrounding sheath concentric therewith, a support base for said sheath, two cylindrical sockets for grid-controlled electron tubes supported with their axes substantially parallel to the axis of said core and having the ends remote from said support base connected directly to the ends of said sheath remote from said base and also adapted to receive the base of said electron tubes, said sockets and said core being of substantially the same length, said sheath having a pair of slots extending from one end thereof parallel to the axis of said sheath, a pair of conductors supported on a base member with their axes substantially parallel to the axis of said core and having their ends remote from said base member positioned for connection to the grid electrodes of said tubes, and a direct conductive cross-connection from said core to a point on said sheath between said slots.

6. In combination with a circuit element comprising a central core and a surrounding sheath concentric therewith, a support base for said sheath, two cylindrical sockets for grid-controlled electron tubes supported with their axes substantially parallel to the axis of said core and having the ends remote from said support base connected directly to the ends of said sheath remote from said base and also adapted to receive the base of said electron tubes, said sockets and said core being of substantially the same length, said sheath having a pair of slots extending from one end thereof parallel to the axis of said sheath, a pair of conductors supported on a base member with their axes substantially parallel to the axis of said core and having their ends remote from said base member positioned for connection to the grid electrodes of said tubes, said conductors being provided with an interconnection movable parallel to their axes, and a direct conductive cross-connection from said core to a point on said sheath between said slots.

7. In combination with a balanced source of alternating voltage having two ungrounded phase terminals, a circuit element comprising a central cylindrical core, a tubular outer sheath insulated therefrom, slots in said sheath each having a length substantially equal to one-quarter of the wave length of said source, a direct-current cross-connection having one end on said sheath between a pair of said slots and its other end on said core, connections from said phase terminals respectively to the ends of said outer sheath between said slots, a coaxial cable having its sheath grounded and connected to said outer sheath adjacent the roots of said slots and having its core connected to said cylindrical core, and means for matching the impedance of said cable with the impedance of said circuit element.

8. In combination with a balanced source of alternating voltage having two ungrounded phase terminals, a circuit element comprising a central cylindrical core, a tubular outer sheath insulated therefrom, slots in said sheath each having a length substantially equal to one-quarter of the wave length of said source, means for connecting one side of an unbalanced circuit to said core and the other side to said sheath adjacent the root of said slots, a direct-current cross-connection having one end on said sheath between a pair of said slots and its other end on said core, connections from said phase terminals respectively to the ends of said outer sheath between said slots, and means for matching the impedance of said cable with the impedance of said circuit element.

9. In combination with a balanced source of alternating voltage having two ungrounded phase terminals, a circuit element comprising a central cylindrical core, a tubular outer sheath insulated therefrom and cross-connected to said core from a point on said sheath between said slots, a pair of slots in said sheath having a length substantially equal to one-quarter of the wave length of said source, and means connecting the sheath of a concentric line having a grounded sheath to said sheath adjacent the root of said slots and the core of said concentric line to said core, connections from said phase terminals respectively to the ends of said outer sheath between said slots, and means for matching the impedance of said cable with the impedance of said circuit element.

10. A balanced-to-unbalanced circuit connector comprising, an outer conductor including a first section and a contiguous second section having a pair of longitudinal slots extending from one end of said outer conductor and forming in said second section a pair of conductive portions, an inner conductor including a first section and a contiguous second section coaxially supported within said first and second sections respectively of said outer conductor and connected to one of said conductive portions, and means for matching the impedance of the circuit comprising the first sections of said outer and inner conductors to the impedance of the circuit comprising said second sections of said outer and inner conductors.

11. In combination with a balanced source of alternating voltage having two ungrounded phase terminals, a circuit element comprising a central cylindrical core, a tubular outer sheath insulated therefrom, slots in said sheath each having a length substantially equal to one-quarter of the wave length of said source, a direct-current cross-connection having one end on said sheath between a pair of said slots and its other end on said core, connections from said phase terminals respectively to the ends of said outer sheath between said slots, a coaxial cable having its sheath grounded and connected to said outer sheath adjacent the roots of said slots and having its core connected to said cylindrical core, the impedance of said cable being matched with the impedance of said circuit element.

12. In combination with a balanced source of alternating voltage having two ungrounded phase terminals, a circuit element comprising a central cylindrical core, a tubular outer sheath insulated therefrom, slots in said sheath each having a length substantially equal to the one-quarter of the wave length of said source, means for connecting one side of an unbalanced circuit to said core and the other side to said sheath adjacent the root of said slots, a direct-current cross-connection having one end on said sheath between a pair of said slots and its other end on said core, connections from said phase terminals respectively to the ends of said outer sheath between said slots, the impedance of said cable being matched with the impedance of said circuit element.

13. In combination with a balanced source of alternating voltage having two ungrounded phase terminals, a circuit element comprising a central cylindrical core, a tubular outer sheath insulated therefrom and cross-connection to said core from a point on said sheath between said slots, a pair of slots in said sheath having a length substantially equal to one-quarter of the wave length of said source, and means connecting the sheath of a concentric line having a grounded sheath to said sheath adjacent the root of said slots and the core of said concentric line to said core, connections from said phase terminals respectively to the ends of said outer sheath between said slots, the impedance of said cable being matched with the impedance of said circuit element.

14. A balanced-to-unbalanced circuit connector comprising, an outer conductor including a first section and a contiguous second section having a pair of longitudinal slots extending from one end of said outer conductor and forming in said second section a pair of conductive portions, an inner conductor including a first section and a contiguous second section coaxially supported within said first and second sections respectively of said outer conductor and connected to one of said conductive portions, the impedance of the circuit comprising the first sections of said outer and inner conductors being matched to the impedance of the circuit comprising said second sections of said outer and inner conductors.

15. In combination with a balanced source of alternating voltage having two ungrounded phase terminals, a circuit element comprising a central cylindrical core, a tubular outer sheath insulated therefrom, slots in said sheath each having a length substantially equal to one-quarter of the wave length of said source, means for connecting one side of an unbalanced circuit to said core and the other side to said sheath adjacent the root of said slots, and a direct-current cross-connection having one end on said sheath between a pair of said slots and its other end on said core, said cross-connection being movable axially along said core and connections from said phase terminals respectively to the ends of said outer sheath between said slots.

16. A balanced-to-unbalanced circuit connector comprising, an outer conductor including a first section and a contiguous second section having a pair of longitudinal slots extending from one end of said outer conductor and forming in said second section a pair of conductive portions, an inner conductor including a first section and a detachable contiguous second section coaxially supported within said first and second sections respectively of said outer conductor and connected to one of said conductive portions, and means for matching the impedance of the circuit comprising the first sections of said outer and inner conductors to the impedance of the circuit comprising said second sections of said outer and inner conductors.

WILLIAM M. RUST.

REFERENCES CITED

The following references are of record in the file of this patent:

UNITED STATES PATENTS

| Number | Name | Date |
|---|---|---|
| 2,169,396 | Samuel | Aug. 15, 1939 |
| 2,246,188 | Roder | June 17, 1941 |
| 2,252,458 | Conklin et al. | Aug. 12, 1941 |
| 2,417,895 | Wheeler | Mar. 25, 1947 |
| 2,438,912 | Hansen | Apr. 6, 1948 |
| 2,462,881 | Marchetti | Mar. 1, 1949 |

OTHER REFERENCES

Radio Digest, November 1937.

Radio Engineering by F. E. Terman (third edition, second impression), copyright 1947 McGraw-Hill.